United States Patent [19]

Reisfeld

[11] 3,852,812

[45] Dec. 3, 1974

[54] SYMMETRICAL DIRECT CURRENT TUNNEL ERASING

[75] Inventor: Frederick Reisfeld, Commack, N.Y.

[73] Assignee: Potter Instrument Company, Inc., Melville, N.Y.

[22] Filed: July 25, 1973

[21] Appl. No.: 382,417

[52] U.S. Cl. .................................. 360/66, 360/118

[51] Int. Cl. ....... G11b 5/02, G11b 5/20, G11b 5/47

[58] Field of Search ....... 179/100.2 D; 360/118, 66, 360/121

[56] References Cited

UNITED STATES PATENTS

| | | | |
|---|---|---|---|
| 3,485,958 | 12/1969 | Bos et al. | 179/100.2 D |

*Primary Examiner*—Bernard Konick
*Assistant Examiner*—Robert S. Tupper
*Attorney, Agent, or Firm*—Nolte and Nolte

[57] ABSTRACT

A tunnel erase magnetic transducer head has a magnetic core with a read/write gap and a pair of tunnel erase gaps symmetrically positioned to erase opposite edges of a recorded track. The erase gaps provide magnetic fields of relatively opposite senses to reduce recorded track width.

5 Claims, 8 Drawing Figures

SYMMETRICAL DIRECT CURRENT TUNNEL ERASING

This invention relates to magnetic recording and reproducing systems, and is more particularly directed to improvements in tunnel erase systems wherein the edges of a recorded track are erased.

Information is frequently recorded on a magnetic medium, for example on a disc, by means of a magnetic transducer head positioned adjacent the medium. Means are provided for moving the magnetic medium with respect to the magnetic head, so that tracks of information are recorded on the surface of the medium.

In one form of magnetic recording, known as the "tunnel erase" system, the magnetic transducer head is provided with a magnetic core having a common gap for recording information on the magnetic mediudm and reading information therefrom. In order to provide an adequate storage density on the magnetic medium, the width of each recorded track must be relatively small and the separation of adjacent tracks must also be small.

In magnetic recording systems of this type, it is frequently desirable to interchange the magnetic medium, so that the information stored on different recorded elements may be available for use. The interchangeability of the recorded elements presents problems of alignment, since, unless substantially complete accuracy in the alignment between the gap and the track is provided, the gap may be aligned partially with more than one track. Separation of the tracks to avoid this problem, when the read and write gaps have the same width, is not desirable in view of the consequent reduction of a storage density. The difficulty of aligning the tracks is increased when the recording medium is a disc, for example a flexible magnetic disc, in view of the normal tolerances, for example in concentricity, of recording media of this type.

In order to overcome this problem, transducing heads have additionally been provided with a pair of erase gaps positioned to erase the edges of a track immediately following the recording of the track. For example, the track may be recorded with a width of 0.028 inches, with edges of the track thereafter being erased to provide a track having a width of for example 0.014 inches. With this technique, known as tunnel erasing, there is a much less danger of alignment of the reading gap with adjacent tracks on the recorded medium, with the tolerances normally expected in recording devices of this type.

In conventional tunnel erase systems of the above described type, it has been found that undesirable second harmonic components are present in the output from the system upon reading of the magnetic track. The reasons for the production of the second harmonic components will be discussed in greater detail in the following paragraphs.

It is therefore an object of this invention to provide a tunnel erase system for magnetic storage devices in which the production of second harmonic components is minimized.

Briefly stated, in accordance with the invention, it has been found that second harmonic components are produced as a result of unsymmetrical fringe erasure, due to the use of magnetic fields in the erase gaps that influence the opposite sides of the magnetic track in the same manner. In order to overcome this problem, the present invention provides symmetrical fringe erasure, thereby resulting in a flux pattern after tunnel erasure which is symmetrical, so that substantially an equal amount of fringe erasure occurs on both types of transitions in the magnetic track. This may be effected by employing erase gaps with opposite magnetic polarities with respect to the direction of relative movement of the transducer head and the magnetic medium.

In order that the invention will be more clearly understood, it will now be explained in greater detail with reference to the accompanying drawings, in which.

Figure 1:
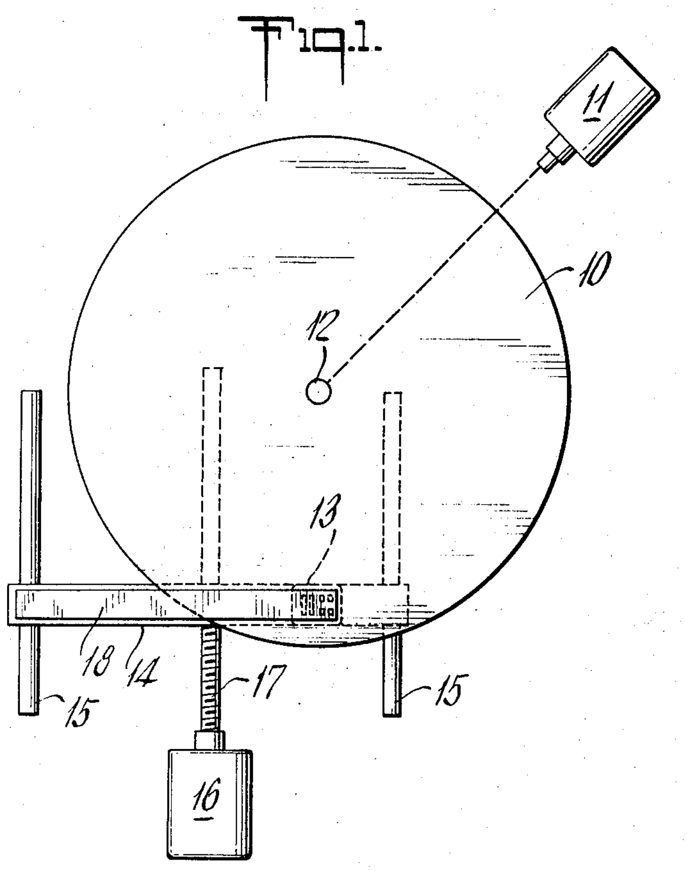
FIG. 1 is a simplified illustration of a magnetic recording system employing a magnetic disc, which may be incorporate the system in accordance with the invention.
Figure 2:
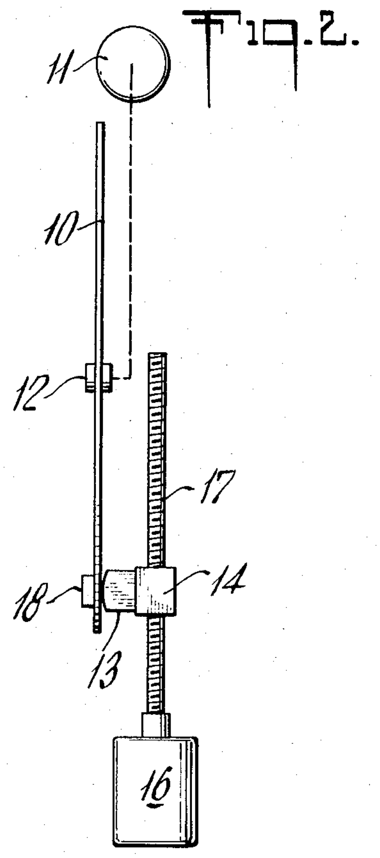
FIG. 2 is a side view of the system of FIG. 1.

Referring now to FIGS. 1 and 2, therein is illustrated in simplified form a magnetic recording and reading system employing a magnetic disc, which may employ the tunnel erasure system in accordance with the present invention. The recording medium may be in the form of a magnetic disc 10, which may be a flexible member. The disc 10 is mounted for rotation by means of a drive motor 11, about its axis 12. A magnetic transducer 13 is mounted adjacent the recording disc 10, so that it may be stepped to any desired radial position on the disc 10. For example, the transducer 13 may be mounted on a beam 14 adapted to be guided by guide rods 15, the radial position of the transducer 13 being controlled by a stepping motor 16 mounted to rotate a lead screw 17. The lead screw may extend through a nut (not shown) in the beam 14, whereby rotation of the lead screw 17 effects the radial movement of the transducer head 13. A pressure pad 18 may be positioned on the opposite side of the disc 10, in order to insure continuous contact between the transducer head 13 and the disc 10.

In this arrangement, the recorded tracks on the disc 10 are in the form of concentric circles, the selection of a track being controlled by the stepping motor 16 according to conventional practice.

Figure 3:
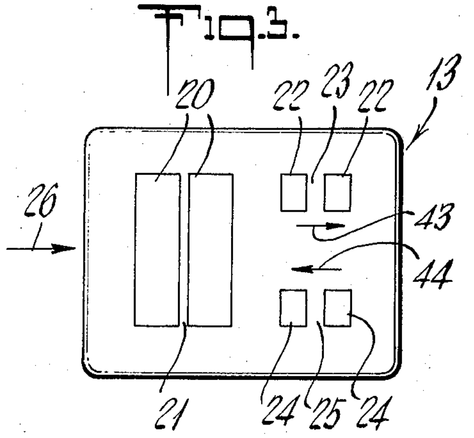
FIG. 3 is a plan view of a magnetic transducer head which may be employed in accordance with the invention.

Referring now to FIG. 3, therein is illustrated a plan view of the face of a transducer head which may incorporate the present invention. The transducer head includes a pair of pole pieces 20 defining a read/write gap 21. In addition, the arrangement comprises a second pair of pole pieces 22 defining an erase gap 23, and a third pair of pole pieces 24 defining an erase gap 25. The relative movement between the transducer head and the magnetic medium is transverse of the gap 21, as illustrated by the arrow 26. The gaps 23 and 25 are arranged symmetrically on opposite sides of the normal to the gap 21, and may, as illustrated in FIG. 3, be parallel to the gap 21. The general configuration of a magnetic transducer as shown in FIG. 3 has been employed in the prior art, and may also be employed in a system in accordance with the present invention. A typical embodiment of a head of this type will be described in the following paragraphs with reference to FIG. 8.

In the arrangement of the prior art, the pole pieces 22 and 24 were magnetically biased by a DC coil to produce a magnetic field in the same direction across their respective gaps with respect to the relative movement between the transducer head and the recording medium. In other words, for example, each of the pole pieces 22 toward the gap 21 may have been arbitrarily a north pole, and each of the pole pieces 22 and 24 away from the gap 21 may have been arbitrarily a south pole.

Figures 4, 5:
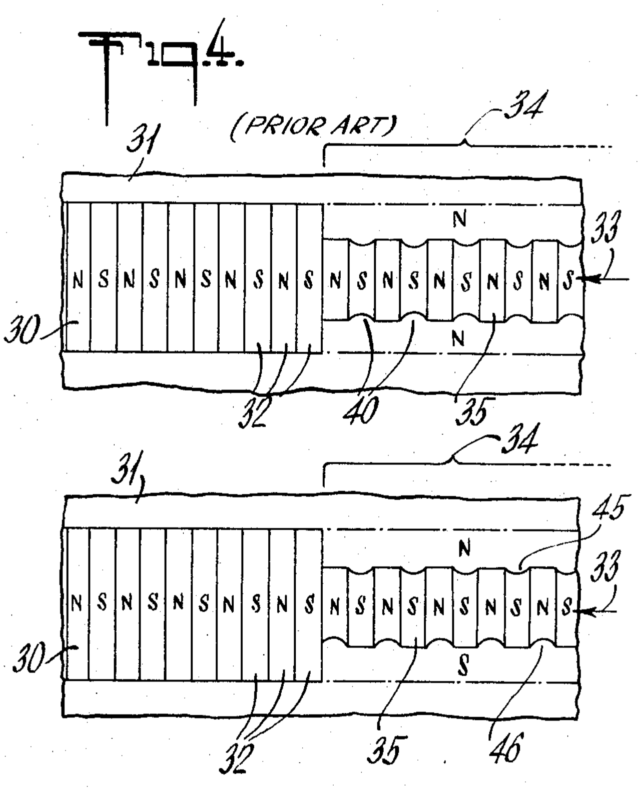
FIG. 4 is an illustration showing the effect of unsymmetrical fringe erasure of a magnetic track, that is produced by systems of the prior art.
FIG. 5 is an illustration of symmetrical fringe erasure that is produced in accordance with the present invention.

A recording track produced by a magnetic transducer head in accordance with the prior art, employing a head of the type shown in FIG. 3, is represented in FIG. 4. A magnetic track 30 is produced on the magnetic recording medium 31, having a width corresponding to the gap 21. The recording field applied to the gap 21 produces a plurality of adjacent regions 32 in the track 30 having senses arbitrarily designated by the letters "N" and "S," as illustrated in FIG. 4. The sense of the recorded data in each region is of course dependent upon the instantaneous field between the pole pieces 20 as the recording medium 31 passes thereunder, and the representation of the regions 30 in FIG. 4 as being alternately "N" and "S" in a regular fashion is purely for the sake of illustration.

As the track 30 passes under the gaps 23 and 25, for example in the direction indicated by the arrow 33, the side portions of the track 30 will be erased, as indicated in the region 34. In this region it is to be noted that the magnetic sense, arbitrarily indicated to be "N" is the same on each side of the unerased portion 35 of the magnetic track. The erasure of the track in the side portions thereof is dependent upon the sense of the recorded region passing the gap, whereby the side fringes of regions "S" of opposite sense have fringe regions 40 in which the influence of the field from the erase gaps 23 and 25 has extended inwardly on both sides of the track. As a consequence, it is apparent that in the tunnel erasure system of the prior art, the density of the recorded field in the "S" areas is less than that in the "N" areas, so that the transitions, upon reading of the tracks are unequal. This results in the production of second harmonic components in the output signal from the read/write head when it is employed for reading the track. The track of FIG. 4, resulting from unsymmetrical fringe erasure thereby results in a flux pattern after tunnel erasure in which an unequal amount of fringe erasure occurs in the recorded areas of the different recorded senses.

In the arrangement of the present invention, however, the gap 23 is provided with a magnetic sense in one direction, for example as indicated by the arrow 43, and the gap 25 is provided with a magnetic sense in the opposite direction as indicated by the arrow 44, with respect to the longitudinal direction of the track. A magnetic track which may be produced in accordance with the invention, in which the gaps 23 and 25 have opposite polarities, is illustrated in FIG. 5. In this track, it is seen that in the region 34 on one side of the magnetic track the erased portion of the track has a field in the sense "N," while the opposite side of the track is erased with a polarity "S." The upper erased portion of "N" sense produces fringe erasure in the recorded "S" regions, and the lower edge portion 46 produces fringe erasure in the "N" portions of the recorded track. As a consequence, the total fringe erasure is the same for both "N" and "S" regions. This fringe erasure which is symmetrical, i.e., an equal amount of fringe erasure occurs on both senses of regions of the recorded track. As a result of this symmetry, the second harmonic components of a reproduced signal are minimized.

In one test comparing the recording technique of the prior art, as exemplified in FIG. 4, with the technique in accordance with the present invention, it was found that the system of the prior art having magnetic fields of the same sense in the tunnel erase gaps produced second harmonics between 20 and 25 db below the fundamental, while in the arrangement according to the present invention, the second harmonic was approximately 35 db below the fundamental.

Figure 6:
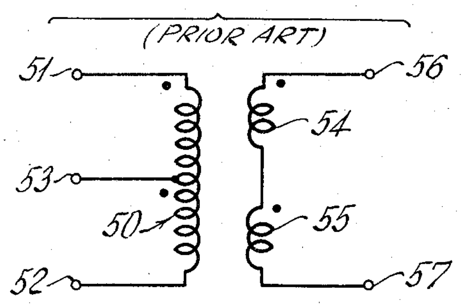
FIG. 6 is a circuit diagram of a magnetic transducer in accordance with the known practice.
Figure 7:
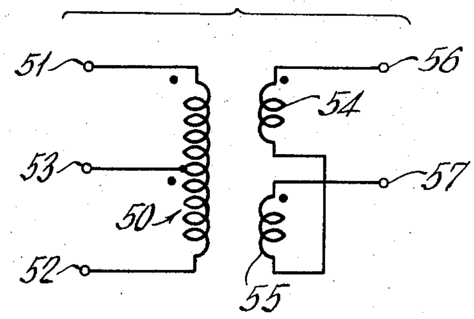
FIG. 7 is a circuit diagram which may be employed in a magnetic transducer in accordance with the present invention.

One method for achieving the reversal of the fields of the tunnel erase gaps in accordance with the present invention is illustrated with reference to FIGS. 6 and 7. The magnetic transducer head is provided with a read/write coil 50 having terminals 51 and 52, and a center tap 53. This coil, in the prior art and in the arrangement of the present invention is connected to conventional recording and reproducing circuits, the coil being wound around the core defining the read/write gap. The transducer head is also provided with a pair of erase coils 54 and 55 wound around the cores defining the erase gaps 23 and 25 respectively of FIG. 3. In accordance with the prior art, the coils 54 and 55 were serially connected between terminals 56 and 57 adapted to be connected to a source of DC erase current, so that the magnetic senses in the gaps 23 and 25 were the same with respect to the longitudinal direction of the recorded track. In the arrangement of FIG. 7, however, the connections to one of the coils, for example coil 55, has been reversed, whereby the fields in the gaps 23 and 25 are opposite with respect to the direction of movement of the recording medium relative to the magnetic head. The polarity of the current applied between the terminals 56 and 57 is not material, it only being necessary in accordance with the present invention that the fields of the two gaps 23 and 25 are opposite.

Figure 8:
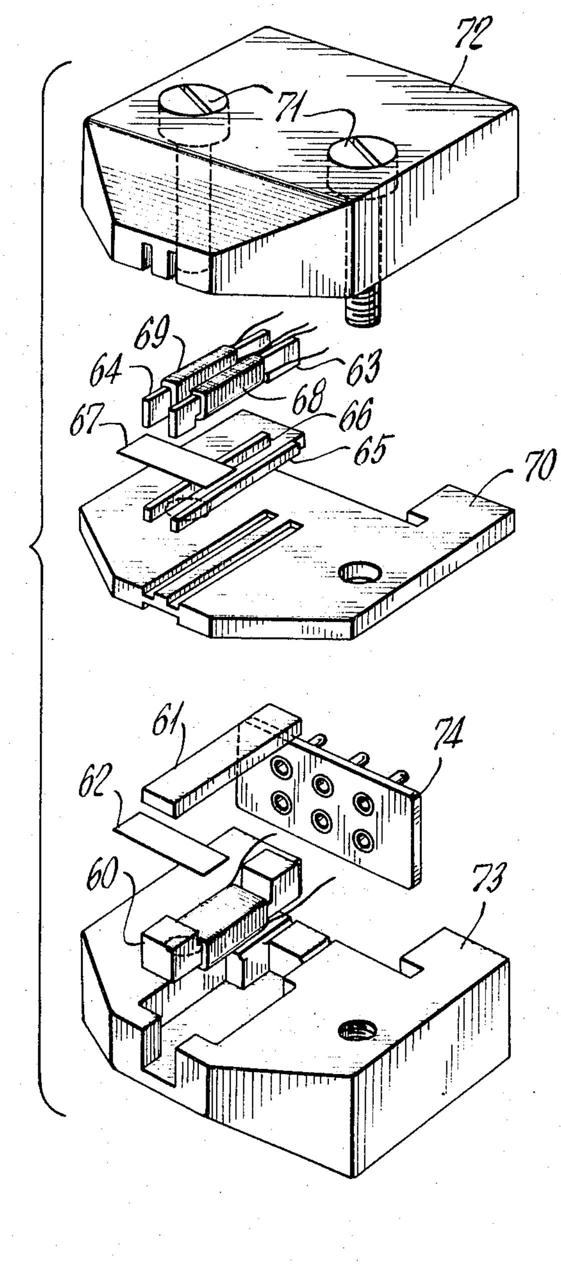
FIG. 8 is an exploded view of a magnetic transducer which may incorporate the features of the present invention.

A typical magnetic transducer head which may incorporate the present invention is illustrated in FIG. 8. In this arrangement a C-shaped magnetic core is provided with a magnetic bar 61 to define a closed magnetic path interupted by a non-magnetic shim 62 defining the read/write gap. The gap may have a width, for example, of 0.0001 inches. The assembly is further provided with a pair of C-shaped cores 63 and 64, the magnetic paths of these cores being closed by magnetic bars 65 and 66 respectively, with a non-magnetic shim 67 in the magnetic path and defining the erase gaps. The shim 67, for example, may have a width of 0.001 inches. The cores 63 and 64 are provided with erase coils 68 and 69 respectively. The assembly comprising the erase cores is separated from the assembly comprising the read/write core by a non-magnetic center block 70, the entire assembly being held together by means of screws 71 extending through head blocks 72 and 73 moulded to conform to opposite sides of the assembly. The assembly may also be provided with a terminal board 74 of conventional nature, for providing interconnections between the coils and external circuits.

In a typical embodiment of a magnetic transducer head incorporating the invention, the read/write gap may have a length of 0.028 inches (i.e., for recording a track of this width), and the tunnel gaps 23 and 25 may have lengths of 0.007 inches, whereby the recorded track after tunnel erasure is approximately 0.014 inches in width. The formation of a magnetic transducer head in accordance with the invention may be by conventional techniques.

While the invention has been disclosed and described with reference to a single embodiment, it will be obvious that variations and modifications may be made therein, and it is intended in the following claims to cover each such variation and modification as falls within the true spirit and scope of the following claims.

What is claimed is:

1. In a magnetic transducer head of the type having a first magnetic core with a gap defining the width of a magnetic track to be recorded, a read/write coil on said first magnetic core, second and third magnetic cores having gaps positioned to erase opposite sides of said magnetic track, and erase coils on said second and third cores; the improvement comprising means for direct current energizing said erase coils and means interconnecting said energizing means and said erase coils for producing magnetic fields of opposite polarity at the respective gaps of said cores with respect to the lengthwise direction of said magnetic track.

2. In a tunnel erase magnetic transducer head of the type having a first magnetic core with a gap substantially defining the width of a magnetic track to be recorded, a read/write coil on said first core, second and third magnetic cores each having a gap and being mounted with their gap symmetrically disposed on opposite sides of the normal to the center of the gap of the first core for erasing opposite edges of a recorded track, and erase coils on said second and third core; the improvement comprising means for direct current energizing said erase cores and means for interconnecting said energizing means and said erase coils to produce equal and opposite polarity magnetic fields at their respective gaps with respect to the lengthwise direction of said recorded track whereby fringe erasure of a magnetic track recorded by said transducer head is symmetrical.

3. The tunnel erase magnetic transducer head of claim 2 wherein the gaps of said second and third cores are coplanar and parallel to the plane of the gap of said first core.

4. A system for recording magnetic tracks on a recording medium comprising transducer means, and means for providing relative movement between said transducer means and said recording medium, said transducer means comprising means for magnetically recording a signal on said medium to produce a magnetic track thereon, and direct current energized means for producing magnetic erasing fields of opposite polarity with respect to the lengthwise direction of the recorded track at opposite edges of said track to erase said edge.

5. A method for magnetically recording a signal on a track on a recording medium comprising producing relative movement between a magnetic transducing means and said recording medium, energizing said transducing means with said signal to produce a recorded track on said recording medium, direct current energizing an edge erasing means to produce magnetic erasing fields of opposite polarity with respect to the lengthwise direction of said recorded track and on opposite edges of said track to erase edge portions of said track whereby fringe erasure of said magnetic track is symmetrical.

* * * * *